M. MARSHALL.
Breaking or Tearing Rags.
No. 133,787. Patented Dec. 10, 1872.
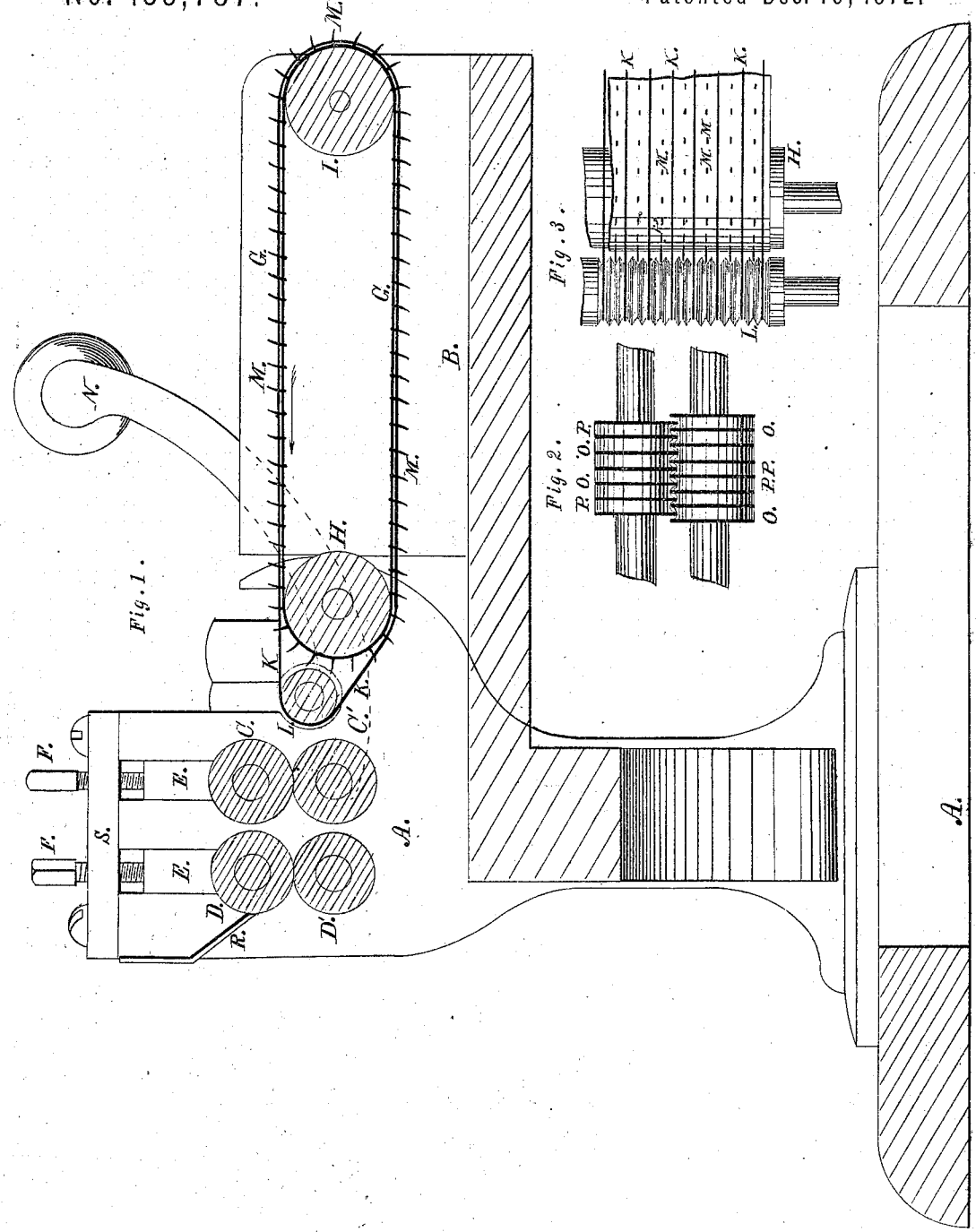

UNITED STATES PATENT OFFICE.

MOSES MARSHALL, OF LOWELL, MASSACHUSETTS, ASSIGNOR TO ANTHONY PEPLE, OF SAME PLACE.

IMPROVEMENT IN BREAKING OR TEARING RAGS.

Specification forming part of Letters Patent No. 133,787, dated December 10, 1872; antedated December 7, 1872.

*To all whom it may concern:*

Be it known that I, MOSES MARSHALL, of Lowell, in the county of Middlesex and Commonwealth of Massachusetts, have invented certain Improvements in Machines for Breaking or Tearing Rags into Strips, of which the following is a specification:

My invention relates to a machine for breaking up one portion of a fabric to facilitate removing that part of said fabric and preserving the other, more especially for breaking or tearing delaines and other similar compound fabrics in the direction of the warp or filling, as the case may be, into narrow strips, in order that the short cross-threads may be shaken, beaten, brushed, carded, or combed out, or otherwise separated from the long threads; and consists, first, in two or more rollers, each of said rollers having annular grooves, and said grooves being wholly or partly filled with rings of India-rubber or other elastic material, said rollers being placed parallel to each other and pressed together so that the metallic rings projecting from each roller shall work against the rubber rings of the other roller or rollers, as hereinafter described; the object of this part of my invention being to stretch the cloth which is fed between the rollers, and to break those threads of said cloth which run parallel to the axes of the rollers; and, second, in an endless feeding-apron supplied with longitudinal rows of teeth on which the cloth or rags may be kept stretched, and traveling upon rollers, in combination with certain cords which pass around said apron between said rows of teeth upon a certain other roller and lift said cloth or rags from said teeth; the object of this part of my invention being to enable the operator to remove all folds and creases from the cloth and to deliver said cloth or rags to the breaking-rollers.

The accompanying drawing represents my invention, and shows the breaking-rollers.

Figure 1 is a general longitudinal section of my invention. Fig. 2 is a view of portions of two grooved breaking-rollers working into each other. Fig. 3 is a top view of part of the apron, clearer-roll, and threads.

The same letters refer to corresponding parts wherever they occur.

A is the frame of my machine. B is a tray extending from the upright portion of the frame A under the apron G. C C' are the rollers of the front pair, placed parallel to each other and one above the other. The working-surface of the rollers C C' consists of rings of metal, O O, alternating with rings of India-rubber or other elastic material, P P, and said rollers are so placed that the metallic rings upon each roller press upon the rubber rings upon the other. D D' are the grooved rollers of the back pair, they being the same in all respects as C C', except that they are geared into each other at the opposite side of the machine. Their use is only to complete the work of the front pair of rollers C C', and the metallic rings of the second pair follow immediately those of the front pair C C'. The metallic rings O O are slightly narrower than the India-rubber rings P P. E E are bearings resting upon the shafts of the upper roller in each pair and at each end of said upper rollers D C. S is a strap firmly secured to the top of the frame A. In this strap turn the screws F F, on each side of the machine, the object of said screws being to force down the bearings E E and press the upper rollers of each pair firmly against the lower ones, the metallic rings O O pressing into, without cutting, the rubber rings P P. G is an endless apron of about the width of the working part of the rollers C C', and traveling upon the rollers H and I. This apron G is provided with teeth M M M, in longitudinal rows. The teeth M are slightly curved backward to hold the cloth back and stretch it, as the rollers C C' move slightly faster than the apron G. Between the apron G and the rollers C C' is a roller, L, around which and around the apron G, between the rows of teeth M, pass endless strings or cords K, which, traveling with said apron, lift the cloth or rags from said teeth as they pass over the roller H, and deliver said rags to the rollers C C'. At the rear end of the machine is the "doctor," R being a sheet of metal which touches the upper roller D, throughout its whole length, the object of the "doctor" being to clear the roller D of the rags. A similar "doctor" may be applied to clear the lower roller D'. N is a crank to operate the machine, and is applied at the end of the shaft of the roller C'. When it is intended to run the machine by any other power than hand-power, a driving-pulley supplies the place of the crank N.

The operation of my machine is as follows: Rags or remnants of cloth are placed upon the apron G, being stretched by the operator down over the teeth M, to take out the folds and wrinkles of said cloth; the teeth keep them stretched. As said cloth or rags get over the roller H, the cords K lift said rags from said teeth and carry them to the grooved rollers C C', which draw them in, and said rags are caught between the metallic rings O on one roller, and the rubber rings P on the other roller, and vice versa; and being thus clamped between said rubber and metallic rings, and thus prevented from any lateral motion, said rags are crowded one way by one roller and the opposite way by the other roller so that they are stretched to nearly twice their width, so that those of their threads which run lengthwise of the breaking-rollers are broken; and the rags are delivered, after passing in a similar way through the second pair of rollers D D', at the back of the machine, either in very narrow strips or in such a condition that a slight shaking separates them into strips. The rags, of course, must be laid on the apron in such a way that they will enter the rolls in the direction of the threads, which are intended to run lengthwise of the strips.

Instead of the grooved rollers, flat plates, grooved and working into other plates or racks of parallel bars, may be used with the same effect, the grooves in the plates and the spaces between the bars being nearly filled with some elastic material.

I make no claim as to the process or method of constructing my rollers, as they may be turned from a solid bar of metal and the rubber rings stretched over them; or they may consist of alternate disks or washers of rubber and metal secured upon a shaft which runs through the center of them, which shaft may be square where it passes through the disks to prevent said disks from turning on the shaft; or said disks may be prevented from turning on the shaft by a spline or key.

In most cases one pair of rollers will be sufficient.

Instead of India-rubber, any other suitable elastic material may be used.

I claim—

1. Two or more metallic rollers C C', when the same are grooved annularly and said grooves are filled or nearly filled with rubber or other elastic material, when the same are arranged, combined, and operated substantially as herein described.

2. The apron G provided with longitudinal rows of teeth M M, in combination with the cords K K and the rollers C C'.

MOSES MARSHALL.

Witnesses:
ALBERT M. MOORE,
NATHANIEL HILL.